United States Patent
Kertscher et al.

(10) Patent No.: US 9,192,108 B2
(45) Date of Patent: Nov. 24, 2015

(54) METHOD FOR PRODUCING DRIP IRRIGATION TUBES

(75) Inventors: Eberhard Kertscher, Yvonand (CH); Cedric Lambert, Neuchatel (CH); Romain Bersier, Yvonand (CH)

(73) Assignee: The Machines Yvonand SA, Yvonand (CH)

( * ) Notice: Subject to any disclaimer, the term of this patent is extended or adjusted under 35 U.S.C. 154(b) by 73 days.

(21) Appl. No.: 14/235,011

(22) PCT Filed: Jul. 20, 2012

(86) PCT No.: PCT/EP2012/064313
§ 371 (c)(1),
(2), (4) Date: Jan. 24, 2014

(87) PCT Pub. No.: WO2013/014088
PCT Pub. Date: Jan. 31, 2013

(65) Prior Publication Data
US 2014/0166187 A1   Jun. 19, 2014

(30) Foreign Application Priority Data

Jul. 27, 2011  (EP) .................................... 11175513

(51) Int. Cl.
  *B32B 37/00* (2006.01)
  *A01G 25/02* (2006.01)
  *B29C 65/08* (2006.01)
  (Continued)

(52) U.S. Cl.
  CPC .......... *A01G 25/026* (2013.01); *B29C 47/0023* (2013.01); *B29C 47/0064* (2013.01); *B29C 47/028* (2013.01); *B29C 47/903* (2013.01); *B29C 65/08* (2013.01); *B29C 65/7894* (2013.01); *B29C 66/004* (2013.01); *B29C 66/112* (2013.01); *B29C 66/114* (2013.01); *B29C 66/1122* (2013.01); *B29C 66/4322* (2013.01); *B29C 66/532* (2013.01); *B29C 66/61* (2013.01); *B29D 23/001* (2013.01); *B29C 53/38* (2013.01); *B29C 65/5057* (2013.01); *B29C 65/5071* (2013.01); *B29C 66/232* (2013.01); *B29C 66/929* (2013.01); *B29C 66/959* (2013.01)

(58) Field of Classification Search
  CPC   B29C 47/0064; B29C 47/028; B29C 47/903; B29C 47/0023; B29C 66/532; B29C 66/61; B29C 65/08
  USPC .................................. 156/73.1, 244.11, 544
  See application file for complete search history.

(56) References Cited

U.S. PATENT DOCUMENTS 4,534,515 A    8/1985  Chapin
5,232,429 A *  8/1993  Cizek et al. ................... 493/299
(Continued)

*Primary Examiner* — James Sells
(74) *Attorney, Agent, or Firm* — Dorsey & Whitney LLP

(57) ABSTRACT

In a method for producing drip irrigation tubes, a body is extruded, from which the tube is formed and in which metering elements (10) are attached, which are connected to the body by means of ultrasonic welding. For such drip irrigation tubes, the water enters the metering elements (10) from the inside of the drip irrigation tubes through inlet openings, flows through the metering elements, and exits the drip irrigation tubes through outlet openings in a metered manner. The body is formed into a tube body, which is flattened, and the metering elements (10) come to be situated in a central region inside this flattened tube body. The flat tube body is fed between a sonotrode (6) and an anvil (7) of an ultrasonic welding device (3), and the metering elements (10) are welded to the walling of the tube body. The invention further relates to a device for carrying out the method.

11 Claims, 5 Drawing Sheets

(51) Int. Cl.
*B29C 65/00* (2006.01)
*B29D 23/00* (2006.01)
*B29C 47/00* (2006.01)
*B29C 47/02* (2006.01)
*B29C 47/90* (2006.01)
*B29C 65/78* (2006.01)
*B29C 53/38* (2006.01)
*B29C 65/50* (2006.01)

(56) References Cited

U.S. PATENT DOCUMENTS

| | | | |
|---|---|---|---|
| 5,387,307 A | | 2/1995 | Roberts |
| 6,120,634 A | * | 9/2000 | Harrold et al. ............... 156/203 |
| 8,777,523 B2 | * | 7/2014 | Stephens et al. ........... 405/302.6 |
| 2009/0025853 A1 | | 1/2009 | Abate |

* cited by examiner

METHOD FOR PRODUCING DRIP IRRIGATION TUBES

CROSS-REFERENCE TO RELATED APPLICATIONS

This application is the national stage application of PCT Patent Application No. PCT/EP2012/064313 filed on Jul. 2, 2012, and entitled "Method for Producing Drip Irrigation Tubes," which claims priority to European Patent Application No. 11175513.8 filed on Jul. 27, 2011, and entitled "Method for Producing Drip Irrigation Tubes," which applications are hereby incorporated by reference into the present application in their entireties.

The present invention relates to a method for producing drip irrigation tubes, in which a body, from which the tube is formed, is extruded and metering elements are attached in the extruded body, which metering elements are connected to the body by means of ultrasonic welding, in which drip irrigation tubes, the water enters the metering elements from the inside of the drip irrigation tubes through inlet openings, flows through the metering elements, and exits the drip irrigation tubes through outlet openings in a metered manner, as well as a device for carrying out the method.

Such drip irrigation tubes provided with metering elements are used for direct irrigation of plants in crops. For this purpose the drip irrigation tubes can be designed in such a way that an outlet opening is located in the region of each plant, for example, through which opening the water from the drip irrigation tube is let out dropwise and in a metered way. By means of this device each of the individual plants can be directly irrigated, and the water can thereby be used very sparingly. With a device of this kind it can be prevented that a large amount of water for irrigation evaporates, as usually happens with irrigation facilities in which the water is distributed over a large area via spraying units. Thus a very economical irrigation can be achieved and a lot of water can be saved by means of the metered irrigation via these drip irrigation tubes.

Various possibilities are known for production of drip irrigation tubes. Known, for example, is that the tube body is extruded and is led through a sizing device, and that the metering elements are inserted continuously into the tube body individually or in the form of a strip and are pressed on the inner surface of the walling of the tube body, whereby a firm connection is achieved since the material of the tube body is still soft and hot.

In order to be able to achieve an optimal connection between tube body and metering elements, connecting the metering elements to the tube body by mean of ultrasonic welding is also known. Known from the document U.S. Pat. No. 5,387,307 is, for example, a method in which the metering elements are impressed on an edge region of the strip. The edge regions are then folded and placed over one another so that the one edge region with the metering elements comes to lie on the other edge region of the strip. The two edge regions are then connected to one another via an ultrasonic welding facility, so that the metering element is embedded in the edge regions. Thereby disadvantageous, however, is that the anvil of the ultrasonic welding device, as support for the sonotrode, has to protrude into the tube body, whereby the anvil has to be designed as cantilevered bending support. This means that during the welding procedure the anvil springs away from the sonotrode, which can have a negative effect on the quality of the welded connection. Tubes produced in this way must also have a certain diameter, so that the anvil can have a sufficiently great stiffness, so that the welding procedure can even be carried out.

An object of the present invention thus consists in creating a method of production of drip irrigation tubes in which the metering elements are able to be connected to the walling of the tube by means of ultrasonic welding and in which an optimal connection quality is ensured.

According to the invention, this object is achieved in that the body is formed into a tube body, which is flattened, and the metering elements come to be situated in a central region inside this flattened tube body, the flat tube body is fed between a sonotrode and an anvil of an ultrasonic welding device, and the metering elements are welded to the walling of the tube body.

Made possible with this method is that the sonotrode and the anvil of the ultrasonic welding device are able to be disposed outside the tube body. In particular the anvil can thereby be supported directly and solidly in the ultrasonic welding facility so that a springing away can be prevented. An optimal quality for the ultrasonic welded connection is thereby ensured. It is also thereby possible to produce drip irrigation tubes of very small diameter, for example.

Preferably the body is extruded substantially continuously in the form of a strip, the metering elements are attached in a longitudinal edge region, both longitudinal edge regions are turned over in such a way that the metering elements of the one longitudinal edge region come to be situated under the other longitudinal edge region and are able to be welded. A simple manufacture of the drip irrigation tube is achieved with this method.

Preferably the metering elements are impressed into the one longitudinal edge region of the strip by a stamping roller. The metering elements can thereby be attached continuously in a simple way in the extruded strip. The device necessary for this purpose is very simple in construction.

Preferably the one longitudinal edge region of the strip is provided during extrusion with a thickening into which the metering elements are then impressed, whereby it is possible to prevent the occurrence of too thin wall areas of the tube during impression of the metering elements in the strip.

The metering elements can however also be impressed or stamped into a further strip, which is then connected to the one longitudinal edge region of the strip, for example by welding.

In another embodiment of the method according to the invention, a closed tubular body is extruded from an extrusion device, in which body the metering elements are inserted and welded, whereby it is ensured that the tubular body has no weak point over its entire circumference.

Preferably the metering elements are inserted into the tubular body individually or in the form of a strip, which can be achieved by a simply constructed device.

Preferably, the extruded tubular body is led through a sizing device into a cooling chamber, in which the ultrasonic welding is carried out. Thereby achieved is that the tubular body has a sufficiently great firmness or solidity so that an optimal welded connection can be obtained. The residual heat of the extruded tubular body is used moreover optimally for the ultrasonic welding, which likewise has a positive effect on the quality of the welded connection.

A further advantageous embodiment of the method according to the invention for production of drip irrigation tubes is thereby achieved in that the amount of energy of the ultrasonic welding is increased in order to reduce the discharge cross-sectional area of the metering elements. The same metering elements can thereby be used for different drip irrigation tube discharge quantities. The reduction of the discharge cross section makes it possible to achieve a larger metering range of the discharged water.

Preferably, the tube provided with metering elements is led through a boring device in which the outlet openings are made in the walling of the tube body, which can be carried out very simply.

Another object of the present invention consists in creating a device for carrying out the method of production of drip irrigation tubes, which device is of simple design and which device makes possible the required stability.

This object is achieved according to the invention in that the ultrasonic welding device is designed in such a way that the sonotrode and the support of the anvil are disposed opposite one another in the ultrasonic welding device. The desired stability of the ultrasonic welding device is thereby obtained.

Preferably the sonotrode is borne in the ultrasonic welding device in a way movable toward the anvil and away therefrom, and the pressing pressure of the sonotrode on the anvil is adjustable, so that drip irrigation tubes of different sizes with respect to diameter and wall thickness are able to be produced with the same device.

Embodiments of the method according to the invention and of the device for carrying out this method will be explained more closely in the following, by way of example, with reference to the attached drawing.

Figure 1:
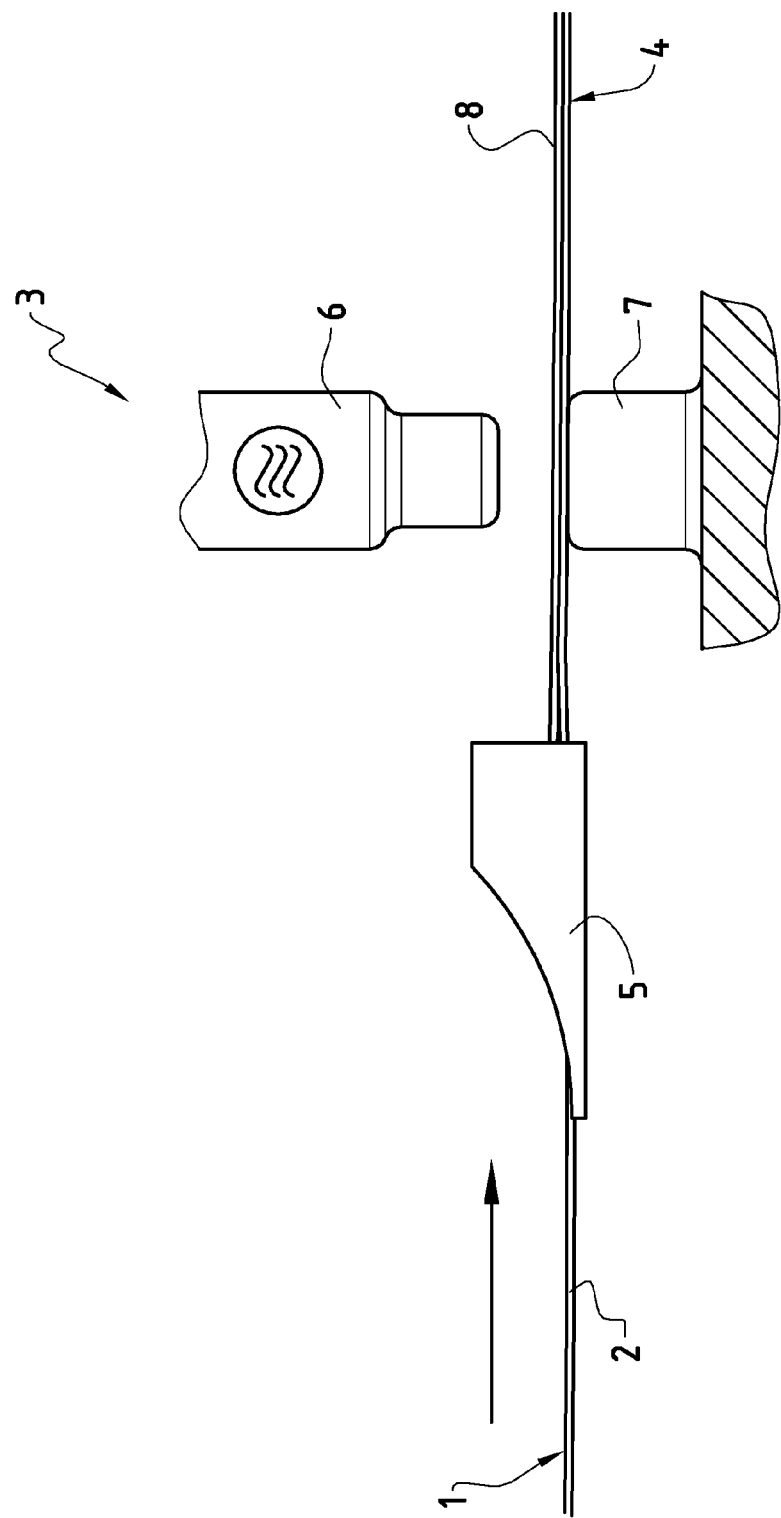
FIG. 1 shows in a diagrammatic representation the production of a drip irrigation tube from a body in the form of a band.

Seen from FIG. 1 is how an extruded body 1, which has the shape of a strip or band 2, is guided through the ultrasonic welding device 3, in order to produce a drip irrigation tube 4. The flat strip or band 2 passes through a folding device 5, in which the two longitudinal side regions are folded inwardly so that the longitudinal edge regions of the strip or band 2 come to lie on top of one another, as will still be seen later in detail, and which strip or band 2 is then led in this folded state through the ultrasonic welding device 3. This ultrasonic welding device 3 is composed in a known way of a sonotrode 6 and an anvil 7. Likewise in a known way (not shown), the sonotrode 6 can be moved toward the anvil 7 and away therefrom. For welding, the sonotrode 6 is moved toward the anvil 7, and is thereby pressed on the folded strip or band 2. In a known way an oscillation frequency is applied to the sonotrode 6, by means of which the ultrasonic welding takes place. The thus welded tube body 8 can be further processed afterwards.

Figure 2:
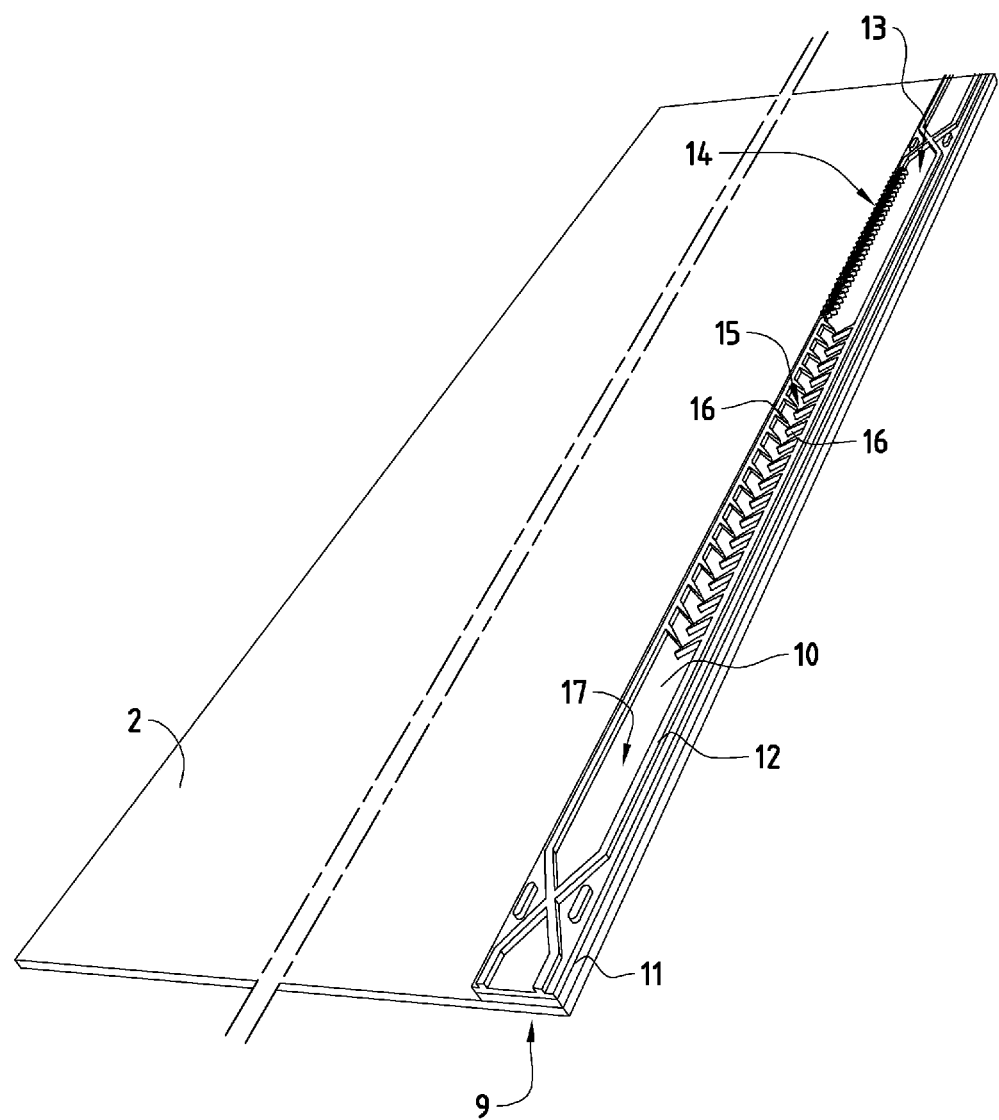
FIG. 2 shows in a spatial representation a section of a band from which the drip irrigation tube according to FIG. 1 is being produced.

An example of a strip or band 2, which can be fed to the ultrasonic welding device 3 according to FIG. 1, is shown in FIG. 2. The metering elements 10 are attached on a longitudinal edge region 9 of this strip or band. For this purpose, a thickening can be extruded, for example, on a longitudinal edge region 9 of the strip or band 2, in which thickening the metering elements 10 can then be impressed using a stamping roller. It is also conceivable for the metering elements 10 to be produced in the form of a further strip or band 11, which further strip or band 11 is then connected to the strip or band 2 in a longitudinal edge region 9 thereof.

Each metering element 10 is surrounded by a protruding side wall boundary 12. In the inlet region 13 of the metering element 10 this side wall boundary 12 is provided with perforations toward the strip or band 2, which perforations form the inlet openings 14 for the water and act as filter. The water entering into this inlet region 13 reaches, via a metering region 15, which is provided with horizontal protrusions 16, and in which a drop in pressure of the water occurs, the exit region 17, from which the water is able to exit, as will be seen later.

Figure 3:
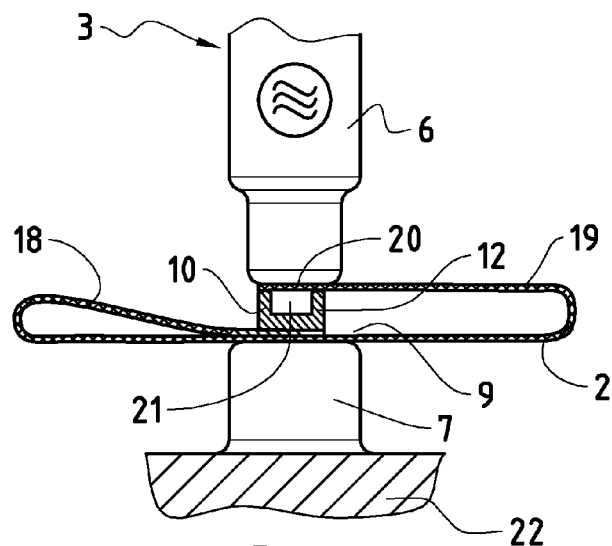
FIG. 3 shows in a diagrammatic representation the feeding of the band in folded state through the ultrasonic welding device.

From FIG. 3 it can be seen how the strip or band 2 according to FIG. 2 in folded state is led through the ultrasonic welding device 3. The two longitudinal side regions 18 and 19 of the strip or band 2 are folded in such a way that the one longitudinal edge region 9 with the metering elements 10 comes to be situated under the other longitudinal edge region 20, and the two overlap one another. The sonotrode 6 is stimulated to oscillate and is pressed against the strip or band 2 to be welded and thus against the anvil 7. The strip or band to be welded 2 is led continuously through this ultrasonic welding device 3. The other longitudinal edge region 20 is welded to the metering element 10, the welding taking place with the side wall boundaries 12 of the metering elements, and the inlet region 13, the metering region 15 and the exit region 17 (FIG. 2) forming the desired hollow space 21.

It has been noted that by means of this configuration a welding takes place only between the other longitudinal edge region 20 of the strip or band 2 and the metering element 10, not however between the strip or band 2 and the one longitudinal edge region 9, which would also not be desirable.

It can also be seen from this illustration that the anvil 7 can be supported in an optimal and stable way in the ultrasonic welding device 3, or respectively its frame 22, as a result of the folding together of the strip or band 2 to form the tube body, whereby a great stability of the welding device is obtained, which has a positive effect on the quality of the welded connection.

Figure 4:
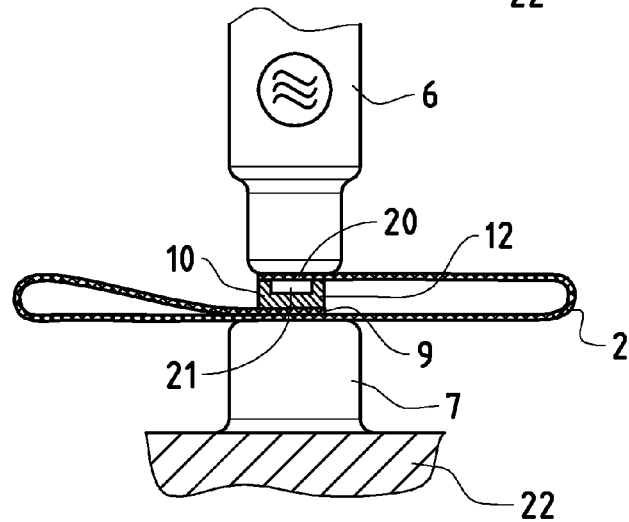
FIG. 4 shows in a diagrammatic representation the feeding of the strip or band in folded state through the ultrasonic welding device with increased energy supply.

Shown in FIG. 4 is the same configuration as is apparent in FIG. 3 and has been described accordingly. The amount of energy fed into the sonotrode 6 has however been increased, which has the result that the side wall boundaries 12 of the metering elements 10, which are connected to the other longitudinal edge region 20, melt more at the places of connection during the welding procedure, whereby the height of the side wall boundaries 12 is reduced and thus the hollow space 21 is decreased. The quantity of water flowing through the metering elements is thereby also decreased. Different metered quantities of the drip irrigation tubes can thereby be achieved with the same prepared metering elements.

Figure 5:
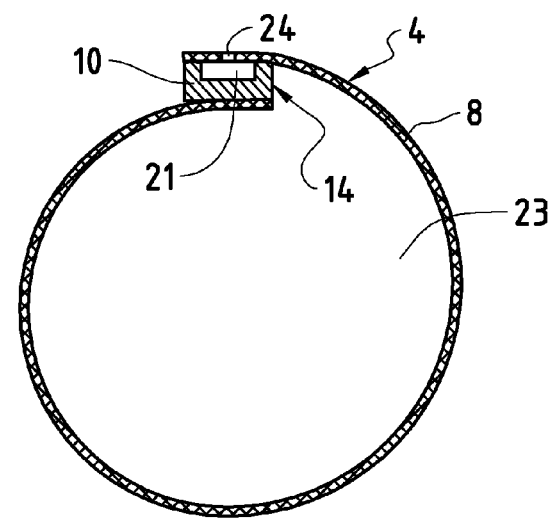
FIG. 5 shows a cross section through a tube that is produced according to FIGS. 1 to 4.

A drip irrigation tube 4 produced according to the previously described production method can be seen in FIG. 5. In operation, the tube body 8 is inflated by the water pressure. The water led into the inner space 23 of the tube body 8 reaches the hollow space 21 of the metering elements 10 via the inlet openings 14. In the exit region a bore 24 is made in the walling of the tube body 8, through which bore the water can escape dropwise and in a metered way.

Figure 6:
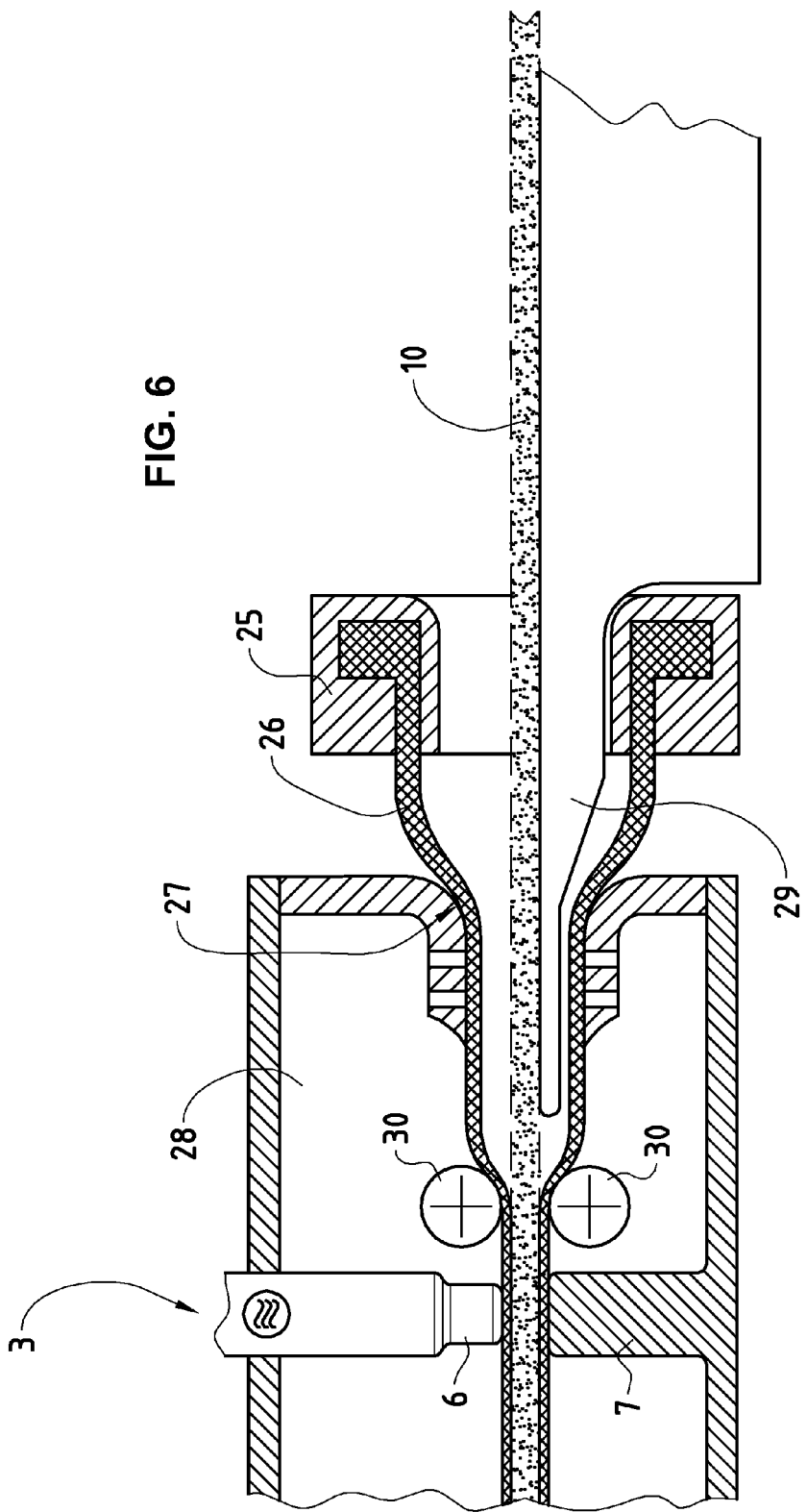
FIG. 6 shows in a diagrammatic representation an extrusion device for a tubular body in which the metering element is inserted and which passes through the ultrasonic welding device.

FIG. 6 shows a method for production of drip irrigation tubes in which a tubular body 26 is continuously extruded from an extruding device 25 in a known way. Also in a known way this extruded tubular body 26 passes through a sizing device 27, in which this tubular body is brought into the correct shape. Coming out of the sizing device 27 the tubular body 26 reaches a cooling chamber 28, in which the tubular body is cooled down to such an extent that it obtains a relatively stable form, which can take place, for example, by immersion in—or spraying with—cooling water in a known way (not shown).

Introduced centrally into the tubular body 26 by the extruding device 25 are the metering elements 10, which are available in the form of a strip, as has been used in the previously described production method, or as individual metering elements. In a known way these reach the tubular body 26 via a guide rail 29. The tubular body 26 is then pressed flat, which can take place by means of two rollers 30, for example, and is led in this flattened state, with the embedded metering elements, into the ultrasonic welding device 3, which is also disposed inside the cooling chamber 28. The flattened tubular body 26 is also thereby led between the sonotrode 6 and the anvil 7 of this ultrasonic welding device, and is welded together with the metering elements 10.

Figure 7:
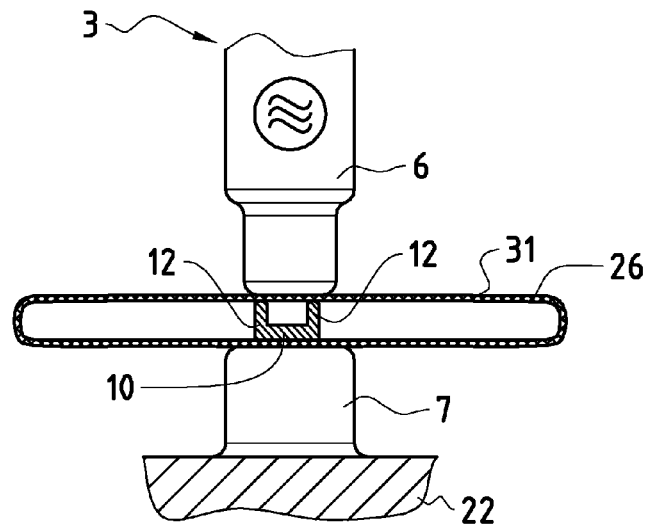
FIG. 7 shows a sectional representation through the tubular body during passage through the ultrasonic welding device according to FIG. 6.

As can be seen from FIG. 7, the pressed-together tubular body 26 with the metering elements 10 embedded therein is led between the sonotrode 6 and the anvil 7 of the ultrasonic welding device 3. The sonotrode 6 is also made to vibrate here, by means of which a welding of the side wall boundaries 12 of the metering elements 10 to the walling 31 of the tubular body 26 takes place. Here too a welding is obtained in this region only. Here too the metering element 10 is not welded to the walling 31 of the tubular body 26 which lies on the anvil 7.

Here too the anvil can be optimally supported in a stable way on the frame 22 of the ultrasonic welding device 3, whereby stable conditions are achieved, which has a positive effect on the welding quality.

Figure 8:
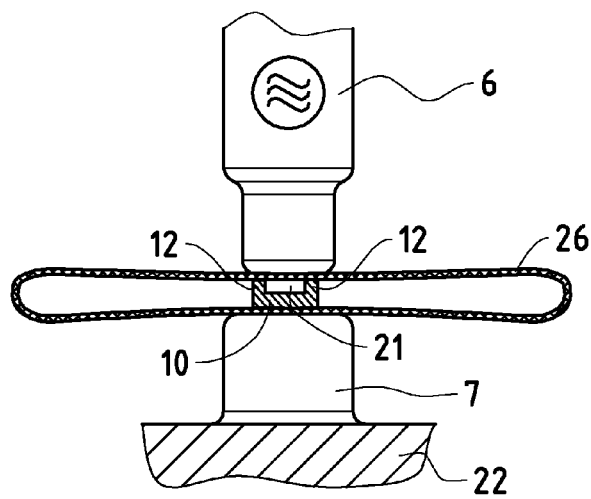
FIG. 8 shows a sectional representation through the tubular body during passage through the ultrasonic welding device according to FIG. 6 with increased energy supply.

As can be seen from FIG. 8, the energy supply to the sonotrode 6 can also be increased here too, corresponding to the procedure described in relation to FIG. 4, whereby here too the upper parts of the side wall boundaries melt more, so that here too the hollow space 21 of the metering elements 10 is reduced and the water flow quantity through the metering elements 10 thereby becomes more minimal.

Figure 9:
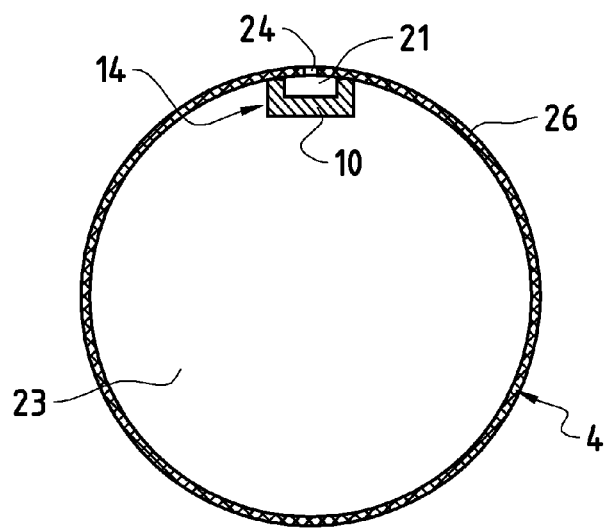
FIG. 9 shows a sectional representation of the drip irrigation tube produced according to FIGS. 6 to 8.

FIG. 9 shows in section the drip irrigation tube, obtained according to the above production method, in operation. The tubular body 26 is inflated by means of the water conducted in the inner space 23 of this drip irrigation tube 4. The water reaches the hollow space 21 of the metering elements 10 via the inlet openings 14, and exits out of the drip irrigation tube 4 in a metered way through a bore 24 made in the region of the metering elements 10.

In the presently described method, the existing tube body or the tube body to be formed, with the metering elements inserted therein, is led continuously through the ultrasonic welding device. In so doing driving speeds can be reached in the range of up to 400 m/min. It is also thereby conceivable that instead of the sonotrode having substantially a prismatic shape, a roller-shaped sonotrode can be used in a known way.

As materials for the tube body and the metering elements, polyethylene can be used, for example. Of course other suitable thermoplastic synthetic materials are also usable.

Good welding results can then be obtained if the ultrasonic welding device operates at a frequency of about 30 kilohertz, the wavelength being about 40 µm, and the contact pressure of the sonotrode being about 40 N/cm².

The metering elements can be designed in various known ways, adapted to the requirements and areas of applications. The length of the metering elements or the spacing of the metering elements from one another may also be configured in practically any way, for instance a stamping roller can be correspondingly designed and have a correspondingly adapted diameter.

In the drip irrigation tubes produced according to these described methods the exit hole is made by a boring device in a known way, which boring device is integrated in the production line, for example.

With the methods and devices according to the invention described here for production of drip irrigation tubes an optimal connection is achieved between the tube bodies and the metering elements, in particular also at high production speeds, which results in an optimal quality of these drip irrigation tubes. With these methods and devices drip irrigation tubes can be produced having practically any desired dimensions. These tubes can have small diameters, but also large diameters. These drip irrigation tubes can be thin-walled, but they can also have larger wall thicknesses, depending upon the conditions under which these drip irrigation tubes are to be employed.

The invention claimed is:

1. A method for producing a drip irrigation tube, the method comprising:
   extruding a tube body, at least a portion of which is flattened
   attaching multiple metering elements in a central region inside the extruded tube body by:
   feeding the flat tube body between a sonotrode and an anvil of an ultrasonic welding device; and
   ultrasonic welding the metering elements to walling of the tube body, wherein the drip irrigation tube is configured such that water enters the metering elements from an inside of the drip irrigation tube through inlet openings, flows through the metering elements, and exits the drip irrigation tube through outlet openings in a metered manner.

2. The method according to claim 1, wherein the tube body is extruded substantially continuously in the form of a strip, wherein the metering elements are attached in a longitudinal edge region, and wherein both longitudinal edge regions are turned over in such a way that the metering elements of the one longitudinal edge region come to be situated under the other longitudinal edge region, and are welded.

3. The method according to claim 2, wherein the metering elements are impressed into the one longitudinal edge region of the strip by a stamping roller.

4. The method according to claim 3, wherein the one longitudinal edge region of the strip is provided during extrusion with a thickening into which the metering elements are then impressed.

5. The method according to claim 2, wherein the metering elements are impressed or stamped into a further strip, which is connected to the one longitudinal edge region of the strip.

6. The method according to claim 1, wherein the tube body comprises a closed tubular body, in which the metering elements are inserted and welded.

7. The method according to claim 6, wherein the metering elements are inserted into the tubular body individually.

8. The method according to claim 7, further comprising advancing the extruded tubular body through a sizing device into a cooling chamber, in which the ultrasonic welding is carried out.

9. The method according to claim 1, further comprising increasing an amount of energy of the ultrasonic welding to reduce a discharge cross-sectional area of the metering elements.

10. The method according to claim 1, further comprising advancing the tube provided with metering elements through a boring device in which the outlet openings are made in the walling of the tube body.

11. The method according to claim 6, wherein the metering elements are inserted into the tubular body in the form of a strip.

* * * * *